United States Patent

[11] 3,571,498

[72] Inventor Hiromichi Kurokawa
Kanagawa-ken, Japan
[21] Appl. No. 796,708
[22] Filed Feb. 5, 1969
[45] Patented Mar. 16, 1971
[73] Assignee Sony Corporation
Tokyo, Japan
[32] Priority Feb. 5, 1968
[33] Japan
[31] 43/7043

[54] SINGLE TUBE COLOR CAMERA UTILIZING COLOR FILTER STRIPS AND MODIFIED INTERLACING

10 Claims, 14 Drawing Figs.

[52] U.S. Cl. .......... 178/5.4
[51] Int. Cl. .......... H04n 9/06
[50] Field of Search .......... 178/5.4, 5.2, 5.4 (STC), 5.4 (RW)

[56] References Cited
UNITED STATES PATENTS
3,291,901 12/1966 Takagi et al. .......... 178/5.2
3,502,799 3/1970 Watanabe .......... 178/5.4STC

*Primary Examiner*—Robert L. Griffin
*Assistant Examiner*—John C. Martin
*Attorneys*—Albert C. Johnston, Robert E. Isner, Lewis H. Eslinger and Alvin Sinderbrand

ABSTRACT: In a color video signal generating apparatus in which an image of an object to be reproduced is projected, as stripelike color components thereof, onto the photoconductive layer of a vidicon tube having an electrical output composed of successive signals corresponding to the light intensities successively encountered by the electron beam of the tube in scanning the photoconductive layer, such stripelike components of the image are extended obliquely to the line scanning direction, and the electron beam is deflected from the normal scanning line, preferably by one-half the pitch between successive scanning lines of a standard raster, for every other scanning line of such raster, so that, when a picture is reproduced from the tube output with the standard raster, periodic noises appearing in the tube output will be randomly distributed in the reproduced picture and hence not readily perceptible.

Patented March 16, 1971 3,571,498

5 Sheets-Sheet 1

INVENTOR.
HIROMICHI KUROKAWA

BY

ATTORNEY

INVENTOR
HIROMICHI KUROKAWA
BY
ATTORNEY

INVENTOR.
HIROMICHI KUROKAWA
BY
ATTORNEY

Patented March 16, 1971 3,571,498

5 Sheets-Sheet 4

INVENTOR.
HIROMICHI KUROKAWA

BY

ATTORNEY

Patented March 16, 1971 3,571,498

5 Sheets-Sheet 5

INVENTOR.
HIROMICHI KUROKAWA
BY
ATTORNEY

SINGLE TUBE COLOR CAMERA UTILIZING COLOR FILTER STRIPS AND MODIFIED INTERLACING

This invention relates to a color video signal generating apparatus, and more particularly is directed to improvements in apparatus of the type wherein one image pickup tube is employed for providing color video signals from which a high grade picture can be reproduced.

Heretofore, color video signal generating systems have been proposed in which one image pickup tube is employed for producing color-separated images in combination with a screen of cylindrical lenses and a color filter, or with a striped or banded color filter. Some of these systems have been disclosed, for example, in copending applications for U.S. Pats., Ser. Nos. 646,045,reproduced and 653,252,filed Jun. 14, 1967, Jun. 13, 1967 and Jul. 13, 1967,respectively, and all assigned to the assignee hereof. This type of apparatus is simple in construction and easy to manufacture and hence is suitable for use in home or industrial color television cameras. However, since this type of apparatus is designed to produce a luminance signal and a chrominance signal by means of a single image pickup tube, a low frequency component contained in the chrominance signal is mixed into the luminance signal and tends to lower the quality of the reproduced picture. For example, in the apparatus as disclosed in the above copending applications, an image of an object is focused on the photoconductive layer of the image pickup tube while being separated into respective color components by a large number of cylindrical lenses, so that when signals of frequencies corresponding to the number of cylindrical lenses and the center frequencies of the respective color components are different from one another, beat signals between the respective frequencies may be mixed into the luminance signal and thereby tend to produce, for example, vertical stripes in the reproduced picture. The foregoing problem is particularly acute when using an image pickup tube having a narrow working frequency band, such as a vidicon tube.

Accordingly an object of this invention is to provide an apparatus for color television cameras employing a single image pickup tube and producing a signal in which periodic noise mixed in the luminance signal component is not perceived visually in the reproduced picture.

Another object is to provide a color television camera using a single image pickup tube, and in which the luminance signal band can be widened for increased clarity of detail in reproduced picture.

Another object of this invention is to provide an apparatus generating a color video signal from which a high grade picture can be reproduced, and in which a single image pickup tube is employed in combination with a screen of cylindrical lenses and a plurality of color filters.

In accordance with an aspect of the present invention, stripelike color components of an image of the object being televised are formed on the photoconductive layer of an image pickup tube so as to extend obliquely to the horizontal scanning direction thereof, and a color video signal is produced by electron beam scanning of the photoconductive layer with the electron beam being vertically deflected slightly from its usual scanning line for every other horizontal scanning, thereby to avoid the display of vertical stripes when the color video signal is reproduced by the usual scanning in a color television receiver.

The above, and other objects, features and advantages of this invention, will become apparent from the following detailed description of illustrative embodiments which is to be in conjunction with the accompanying drawings, in which.

Figure 6:
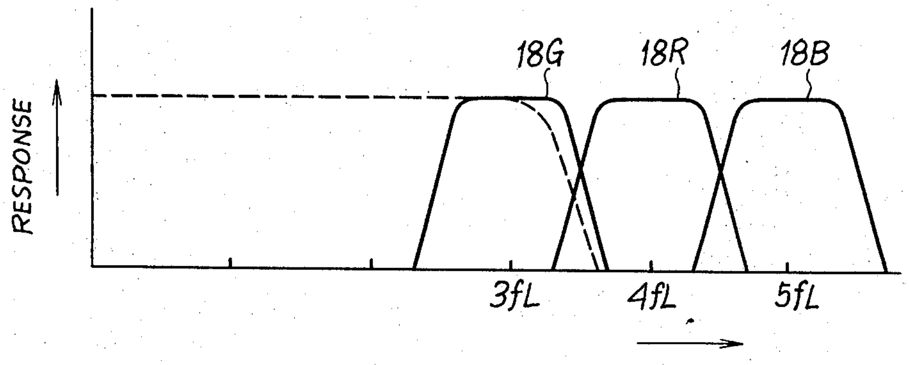
Figures 4A, 4B, 5A, 5B:
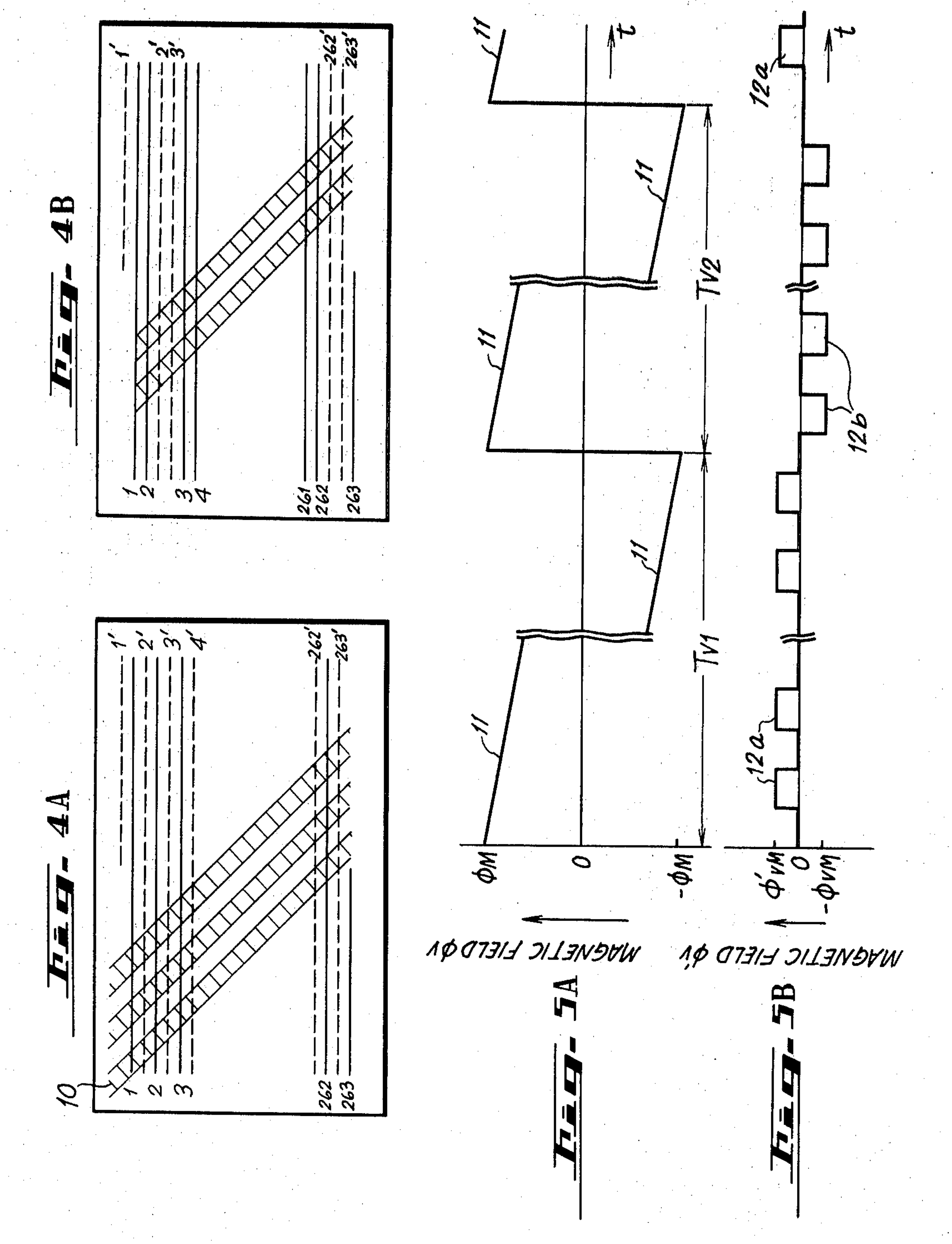
Figure 7A:
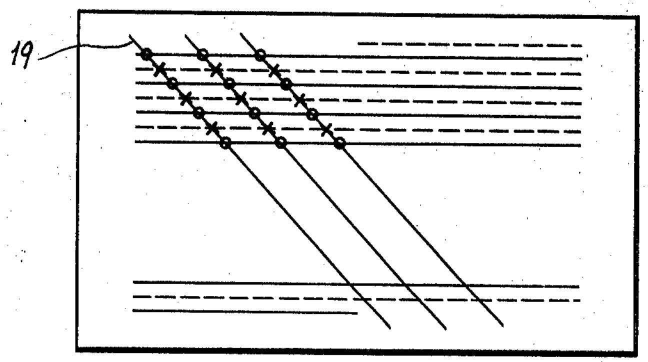
Figure 7B:
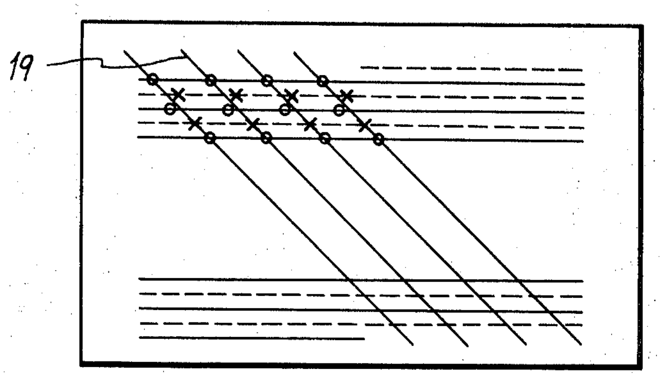
Figure 10:
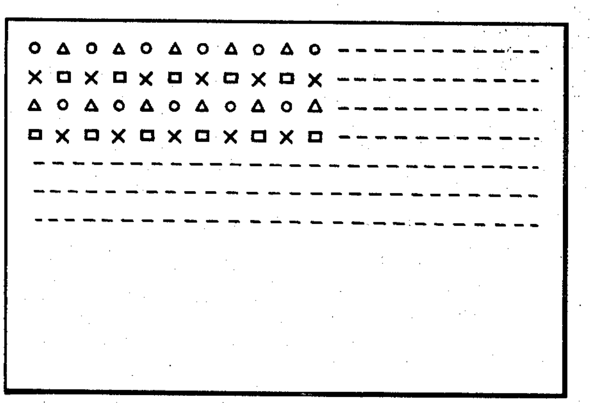
Figure 8:
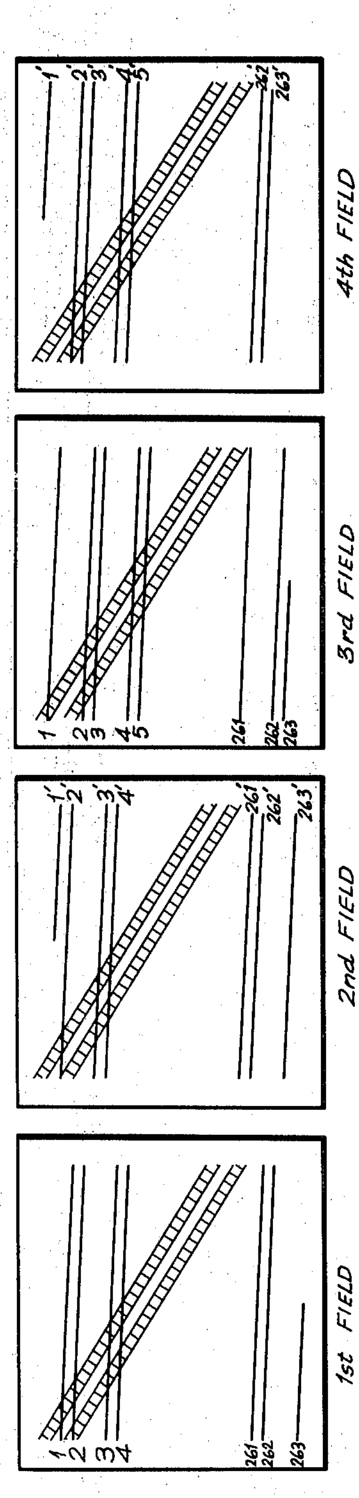
Figures 9A, 9B:
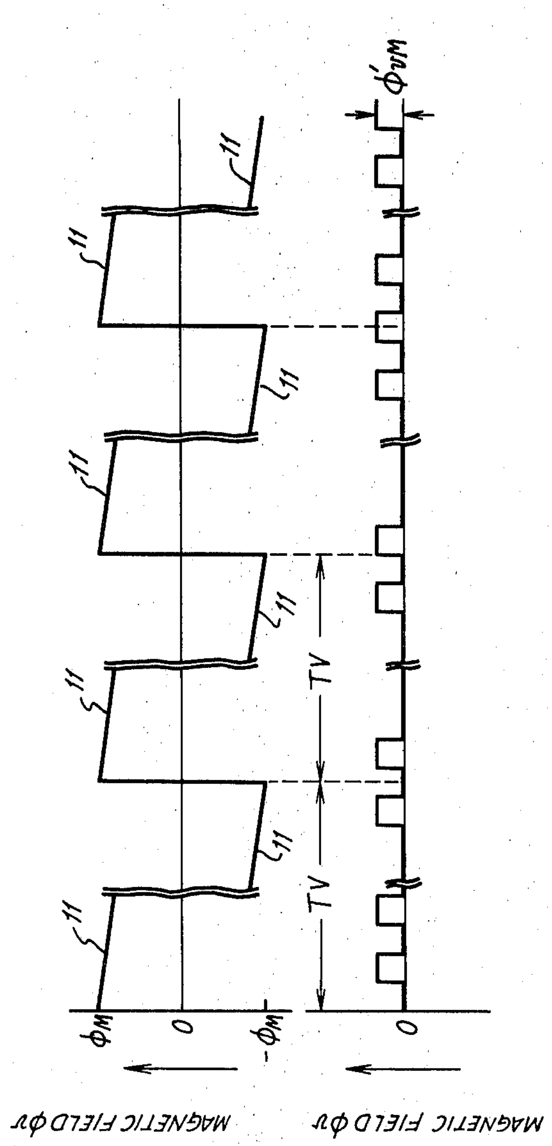

FIGS. 4A and 4B schematically show the relationship between horizontal scanning lines and the direction of the cylindrical lenses when the latter are scanned according to the usual pattern and according to a pattern of this invention, respectively;

FIGS. 5A and 5B respectively show signals for effecting the vertical deflection and the vertical microdeflection of an electron beam scanning the photoconductive layer of an image pickup means in accordance with the present invention;

FIG. 6 is a graph showing the frequency band characteristics of color signals produced by the apparatus according to this invention;

FIGS. 7A and 7B show the patterns of color carrier signals appearing in the reproduced picture;

FIG. 8 consists of diagrams showing the relationship between the scanning lines and the cylindrical lenses for four successive fields in a modified form of this invention;

FIGS. 9A and 9B are signal diagrams similar to FIGS. 5A and 5B, but showing vertical deflection signal and the vertical microdeflection signal for causing an electron beam to scan the photoconductive layer of the image pickup means in accordance with another embodiment of this invention; and FIG. 10 is a schematic diagram showing the patterns of the center frequencies of color signals appearing in the reproduced picture.

Figure 1:
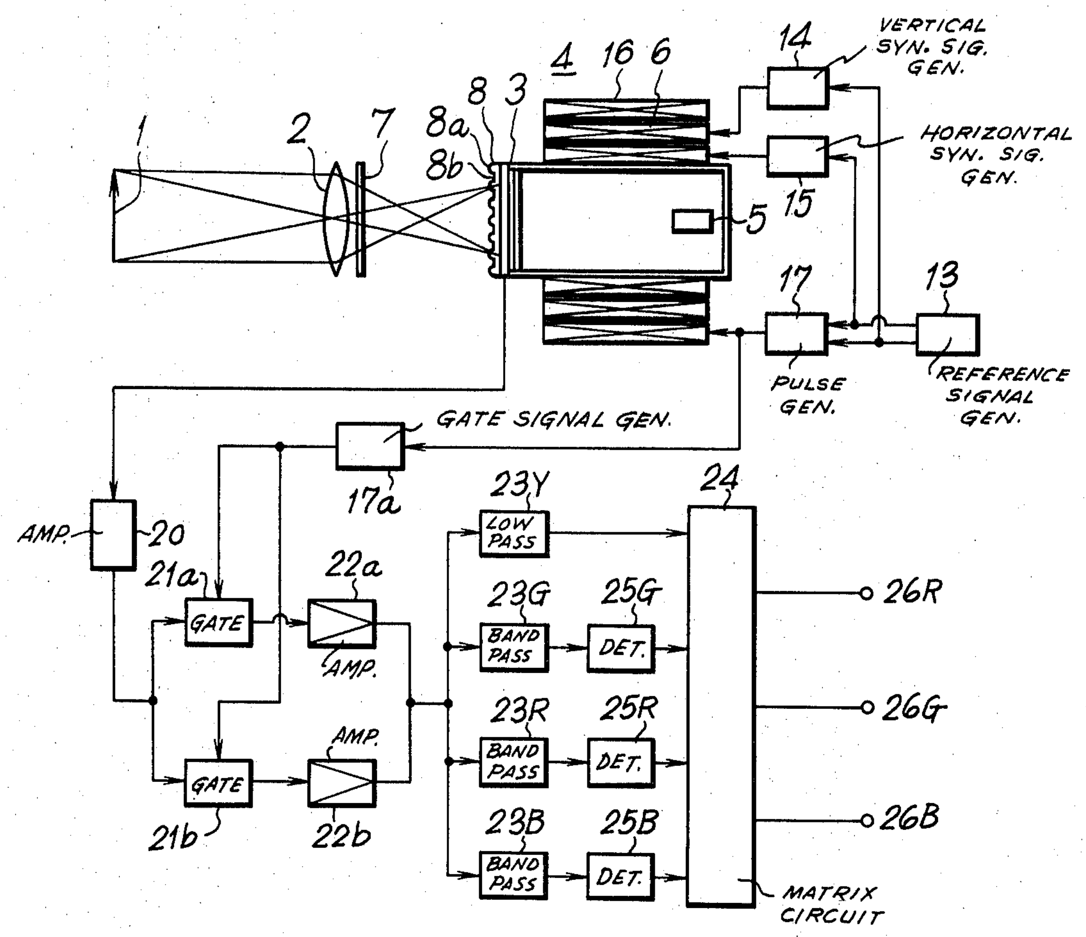
FIG. 1 is a block diagram schematically illustrating a color video signal generating apparatus according to one embodiment of this invention.

Referring to FIG. 1 in detail, it will be seen that, in a color video signal generating apparatus according to this invention, an image of an object 1 to be televised is focused by a camera lens 2 onto a photoelectric conversion layer 3 of an image pickup tube 4. In the present example the photoelectric conversion layer 3 may be a photoconductive layer of a vidicon tube, which further comprises an electron gun 5 adjacent the end of the envelope remote from the photoconductive layer 3 and horizontal and vertical deflection means 6. A color filter assembly, generally indicated by 7, is disposed in the optical path between the camera lens 2 and the photoconductive layer 3.

Figure 2:
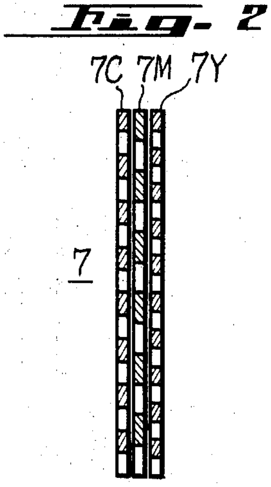
FIG. 2 shows, in cross section, color filters that may be used in the embodiment of FIG. 1.

As shown on FIG. 2, the color filters 7 may comprise a banded or striped filter 7M consisting of six stripelike filter elements primarily permitting the passage of magenta color light therethrough and disposed at regular intervals; a banded filter 7C consisting of eight stripelike filter elements primarily permitting the passage of cyan color light therethrough; and a banded filter 7Y consisting of ten stripelike filter elements primarily permitting the passage of yellow color light therethrough, the filters being arranged in overlapping relation with the stripelike filter elements arranged parallel to one another.

Figure 3:
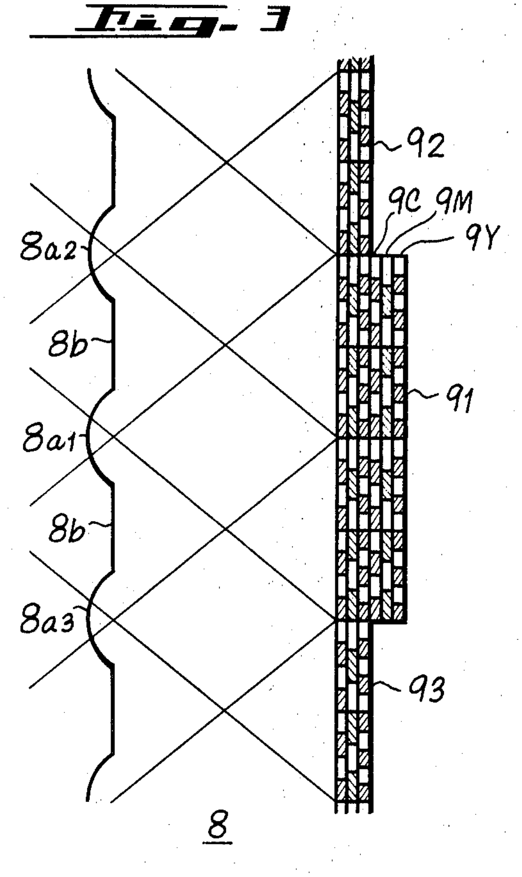
FIG. 3 is a schematic diagram showing the manner in which color separation is effected in the embodiment of FIG. 1.

Further as shown on FIG. 1, a lens screen 8 consisting of many cylindrical lenses 8*a* is disposed in the optical path between the color filter 7 and the photoconductive layer 3. In the illustrated embodiment, the lens screen 8 includes the cylindrical lenses 8*a* and flat portions 8*b* (FIG. 3) arranged alternately therebetween, and is disposed with the cylindrical lenses 8*a* extending in parallel relation to the stripelike filter elements of the color filters of assembly 7. Thus, images of the color filters are projected by cylindrical lenses 8*a* onto the photoconductive layer 3, thereby to form the images of the filters continuously on the photoconductive layer 3. For example, as depicted in FIG. 3, the color filters 7C, 7M and 7Y are focused by the cylindrical lens $8a_1$ into images 9C, 9M and 9Y on the photoconductive layer 3 and these images overlap at both ends those images of the filters which are formed by cylindrical lenses $8a_2$. and $8a_3$ adjacent the lens $8a_1$, so that the images 9C, 9M and 9Y of the color filters are formed contiguous to one another. In this manner, the image of object 1 is separated into respective color components by the images of the color filters. A color television signal is produced by scanning the photoconductive layer 3 with an electron beam emitted from the electron gun 5 and which is moved across the stripes of the striped color-separated image of object 1. Further, the object image is projected through flat portions 8*b* to provide the luminance signal.

In accordance with the present invention, the lens screen 8 is disposed with its cylindrical lenses 8*a* lying obliquely to the horizontal scanning lines of the electron beam, and the electron beam is slightly deflected in a vertical direction every other horizontal scanning line from normal raster. The vertical microdeflection of the electron beam is less than the spacing between the usual adjacent horizontal scanning lines of the normal raster, and is preferably one-half of such normal spacing.

Referring in detail to FIG. 4A, it will be seen that the scanning lines of a first field (an odd-number field) for the usual interlaced scanning are shown in full lines at 1', 2', 3', . . . 263'. while the scanning lines of a second field (an even-number field) are shown in broken lines at 1', 2', 3', . . . 263'. Further, in FIG. 4A, images of the cylindrical lenses 8*a* projected onto the photoconductive layer 3 are indicated at 10. The lens screen 8 is disposed relative to the photoconductive layer 3 in such a manner that the images 10 of cylindrical lenses 8*a* extend obliquely to the horizontal scanning lines as mentioned above. Further, on FIG. 4B, the electron beam is slightly deflected in a vertical direction every other horizontal scanning as previously described. Thus, on FIG. 4B, the first scanning line 1 is in its normal position, the second scanning line 2 is shifted upward from its normal position by a distance equal to one-half the pitch of the horizontal scanning lines for the usual interlaced scanning, and consequently the scanning line 2 is brought to the position occupied by the second scanning line 2' of the second field for the usual interlaced scanning (FIG. 4A). The third scanning line 3 is also at its normal position and the fourth scanning line 4 is shifted upward from its normal position by one-half the normal pitch of the horizontal scanning lines, that is, in FIG. 4B, the fourth scanning line 4 is brought to the position of the scanning line 4' of the second field in FIG. 4A. In this manner, the even-number scanning lines of the first field are shifted one-half pitch thereof to lie in the positions of the even-number scanning lines of the second field and, as a result, in the first field two scanning lines are formed at regular intervals of two scanning lines and in the second field two scanning lines are formed between the pairs of scanning lines of the first field. For example, as shown on FIG. 4B, the odd-number scanning lines 1', 3', . . . of the second field are held at their normal positions, while the even-number scanning lines 2', 4', . . . are shifted down one-half pitch from their normal positions to lie at the normal positions of the even-number scanning lines of the first field.

The slight vertical displacement of the electron beam required for selective displacements of the scanning lines, as described above, may be carried out in the following manner. In order to achieve the displacement through the use of a magnetic filed, during the first filed $TV_1$ a pulse, for example, in the form of a rectangular signal 12*a* (FIG. 5B) is superimposed on a deflecting sawtooth wave signal 11 in a positive direction at every other horizontal period, that is, a signal 12*a* is provided for deflecting the electron beam upward by one-half pitch from its normal scanning position during the first field $TV_1$. During the second field $TV_2$, a pulse 12*b* is superimposed on the sawtooth wave signal 11 in a negative direction in such a manner that the electron beam is deflected down one-half pitch from its normal scanning position at every other scanning line during the second field $TV_2$. In order to achieve the foregoing, the output of a reference signal generator 13 (FIG. 1) is applied to vertical and horizontal synchronizing signal generator circuits 14 and 15, the vertical and horizontal synchronizing signals from which are respectively fed to the respective coils of electron beam deflection means 6. The vertical deflection signal is, for example, a sawtooth wave signal 11 as partially shown on FIG. 5A. Further, a vertical microdeflection means 6, and the output of synchronizing signal generator 13 is applied to a pulse generator 17 to derive therefrom a pulse as shown in FIG. 5B, and the pulse thus produced is fed to the vertical microdeflection coil 16. It is possible for the output of pulse generator 17 to be applied to the vertical deflection coil of deflection means 6, but the output pulse is of relatively high frequency so that the rise characteristic of the pulse becomes dull when fed to the vertical deflection coil. For this reason, it is preferred to provide the separate vertical deflection coil 16 especially for microdeflection and which is capable of producing pulses of sufficiently sharp rise.

In the foregoing example, if the lens frequency $f_L$ is the product of the number of cylindrical lenses in screen 8 and the horizontal scanning frequency of the vidicon tube, and if stripelike images 9M of the magenta color filter 7M are projected on layer 3 in the area thereof corresponding to the pitch between adjacent cylindrical lenses 8*a*, as is apparent from FIG. 3, then, accordingly, the frequency of scanning of the images 9M is $3f_L$ and a signal for green color complementary to magenta is produced with its frequency centering on $3f_L$, as indicated in at 18G on FIG. 6. Similarly, red and blue color signals 18R and 18B are produced which have center frequencies of $4f_L$ and $5f_L$, respectively, corresponding to the cyan and yellow color filters 7C and 7Y. When the carrier frequency $3f_L$, of such green color signal 18G lies in the luminance signal band represented by the broken line on FIG. 6, bright and dark stripes appear in the reproduced picture extending in the lengthwise direction of the cylindrical lenses 8*a*.

When a video signal is produced with the usual interlaced scanning and is reproduced, again with the usual interlaced scanning, for example, as shown on FIG. 4A, bright portions are produced, as indicated by circles on the horizontal scanning lines of the first field (FIG. 7A), in accordance with the carrier $3f_L$ and bright portions are similarly produced, as indicated by crosses on the horizontal scanning lines of the second filed. Further, it will be seen that the circles and crosses representing bright portions on FIG. 7A are aligned on straight lines 19 at equal intervals across the horizontal scanning lines and consequently stripes of bright and dark portions appear in the reproduced picture. However, when a video signal is produced by the apparatus of this invention in the manner described above with reference to FIG. 4B, and such signal is reproduced by usual electron beam scanning at regular intervals, that is, with the usual interlaced scanning, the even-number scanning lines, which were shifted at the time of picking up the image, are respectively returned to their normal positions during reproduction. Accordingly, the bright and dark portions produced by the color signal carrier on the even-number horizontal scanning lines are displaced along the scanning lines from the positions indicated in FIG. 7A to positions as shown in FIG. 7B. Further, since the even-number horizontal scanning lines of the first and second field have been shifted in opposite directions, that is, in upward and downward directions, respectively, the bright and dark portions due to the frequency $3f_L$ in the reproduced picture are similarly displaced laterally in opposite directions on the horizontal scanning lines. Consequently, the bright and dark portions due to the frequency $3f_L$ are not aligned on straight lines to appear as stripes, but rather are distributed at random and hence are of noticeable or perceived in the reproduced picture. As a result of this, the luminance signal frequency band can be enlarged to the vicinity of the carrier $3fL$, as indicated in broken lines on FIG. 6, whereby details of the object can also be reproduced.

Where the spot at which the electron beam impinges on layer 3 is relatively large in such a color video signal generating apparatus, the first horizontal scanning line 1 and the immediately subsequent scanning line 2 in the first field come close to each other, and thus may interfere with each other. That is, when the first and second scanning lines partly overlap, the output signal level of the second scanning line because of the reduced electric charge appearing on the overlapped area during the second scanning thereof. In view of this, it is preferred to control an amplifier for the output video signal so as to raise the degree of amplification for the signal of the second scanning line as compared with the degree of amplification for the signal of the first scanning line. To this end, in FIG. 1, the output of the image pickup tube 4 is fed through an amplifier 20 to gate circuits 21*a* and 21*b*, the outputs of which are respectively applied to amplifiers 22*a* and 22*b*. The gain of the amplifier 22*b* is selected to exceed that of the other amplifier 22*a*. Further, the output of pulse generator 17 is applied to a gate signal generator 17*a* to produce a gate signal synchronized with the vertical microdeflection signal 12*a*, 12*b*, and the gate signal from generator 17*a* is fed to gate circuits 21*a* and 21*b* with opposite polarities to control them in such a manner as to open gate circuit 21*a* when the electron beam scans the photoconductive layer 3 along the odd-number scanning lines and to open gate circuit 21*b* when the electron beam scans along the even-number scanning lines. Thus, the output levels of the amplifiers 22*a* and 22*b* are rendered substantially equal. The outputs of amplifiers 22*a* and 22*b* are combined together, and the combined output is applied to a matrix circuit 24 through a low pass filter 27Y for the luminance signal. Further, the combined output is also fed to band-pass filters 23G, 23R and 23B, the center frequencies of which are respectively selected to be $3f_L$, $4f_L$ and $5f_L$, and the outputs of the filters are applied to detector circuits 25G, 25R and 25B. Then, the detected outputs are fed to matrix circuit 24 to derive red, green and blue color signals from output terminals 26R, 26G and 26B of matrix circuit 24.

In the above described embodiment of the invention, the even-number scanning lines in the odd- and even-number fields are slightly deflected in upward and downward directions, respectively, it is possible to deflect alternate scanning lines in the same direction both in the even- and odd-number fields. Thus, as shown on FIG. 8, the even-number scanning lines 2, 4, 6 . . . and 2′, 4′, 6′ . . . of the first and second fields may be displaced by one-half their normal pitch in an upward direction, while the odd-number scanning lines 1, 3, 5 . . . and 1′, 3′, 5′ . . . of the third and fourth fields are similarly displaced one-half pitch in the upward direction, and the same operations are repeated for the following fields on a four-field cycle. In order to achieve the foregoing displacements, the microdeflection signals may be as shown in FIG. 9B relative to the vertical deflection signal depicted in FIG. 9A. FIG. 10 schematically illustrates the composite patterns of the bright portions appearing in the reproduced picture by reason of the color signal carrier when the camera output for the four fields of FIG. 8 is reproduced under normal scanning conditions. In FIG. 10, circles indicate the bright portions in the first field and crosses, triangles and squares respectively indicate the bright portions of the second, third and fourth fields. Since the bright portions are scattered at random, and thus stripes due to the color signal carrier are not noticeable in the reproduced picture.

In the embodiment of the invention illustrated by FIG. 8, it will be seen that the portions of layer 3 scanned in two successive fields, for example, in the first and second fields, are not scanned during the subsequent two fields, that is, the third and fourth fields. Consequently, a substantially high output signal level is achieved upon the scanning along a line which has not been scanned during the two preceding fields. Of course, in each field, output signals of high and low output levels appear upon the scanning of successive lines and, therefore, an arrangement similar to that of FIG. 1 is preferably employed to maintain the combined output from the amplifiers 22*a* and 22*b* at a substantially constant level. Although the invention has been described herein as applied to an image pickup tube 4 in which deflection of the electron beam is effected electromagnetically, it will be apparent that the invention may be similarly applied to image pickup tubes in which the electron beam deflection is electrostatically effected. Further, in the circuit illustrated by FIG. 1, the color signals are separated as to their frequencies by the band pass filters 23G, 23R and 23B, but it is obvious that such signals may be separated on the basis of their phase differences.

Having described specific embodiments of the invention with reference to the drawings, it is to be understood that the invention is not limited to those precise embodiments and that various changes and modifications may be effected therein by one skilled in the art without departing from the scope or spirit of this invention.

I claim:

1. An apparatus for generating color video signals to be employed with a standard raster in reproducing a corresponding picture, comprising image pickup means having scanning means and being operative to photoelectrically convert light projected on the image pickup means into an electrical output composed of successive signals corresponding to the intensities of light successively encountered by said scanning means in a line scanning direction, filter means interposed optically between an object to be televised and said image pickup means and having several regions respectively selecting light of different wavelength ranges, means cooperating with said filter means for dividing an image of the object to be televised into respective color component stripes projected onto said image pickup means and which extend obliquely with respect to said line scanning direction, and means effective for every other scanning line of said standard raster to deflect said scanning means perpendicular to said line scanning direction from the corresponding line of said standard raster by a distance that is less than the pitch between successive scanning lines in said standard raster, whereby to avoid the visual perception, in pictures reproduced with said standard raster from said output, of periodic noises contained in said output.

2. An apparatus according to claim 1, in which said means cooperating with the filter means for dividing the image of the object to be televised includes a screen of parallel cylindrical lenses arranged with the longitudinal axes of the latter extending obliquely with respect to said line scanning direction.

3. An apparatus according to claim 2, in which said regions of the filter means are of striplike configuration and have their lengths extending parallel to said axes of the cylindrical lenses.

4. An apparatus according to claim 3, in which said filter means includes a plurality of color filters having said stripelike regions as parts thereof, the stripelike regions of each of said color filters select light of a wavelength range different from that selected by the regions of the other color filters, and the number of said stripelike regions of each of said color filters is different from the number of said regions in said other color filters.

5. An apparatus according to claim 1, in which said distance by which the scanning means is deflected for said every other scanning line is substantially one-half said pitch between successive scanning lines in said standard raster.

6. An apparatus according to claim 5, in which said raster is the standard for interlaced scanning.

7. An apparatus according to claim 1, in which said image pickup means has a photosensitive layer onto which the divided image of the object to be televised is projected, said scanning means includes an electron beam directed against said layer and electron beam deflection means receiving deflection signals to deflect said electron beam in accordance with said standard raster, and said means to deflect the scanning means from the corresponding line of said standard raster includes second electron beam deflection means separate from the first mentioned electron beam deflection means and pulse generating means supplying additional deflection signals to said second electron beam deflection means during said every other scanning lines.

8. An apparatus according to claim 1, further comprising amplifier means for amplifying said output of the image pickup means, and means to relatively increase the gain of said amplifying means for the signals of said output which result from each scanning of a line that is at a relatively small distance from the next preceding scanning line.

9. An apparatus according to claim 1, in which said raster is standard for interlaced scanning, and said scanning means is deflected by said distance in one direction perpendicular to said line scanning direction for each even-number scanning line of each odd-number field and in the opposite direction perpendicular to said line scanning direction for each even-number scanning line of each even-number field.

10. An apparatus according to claim 1, in which said raster is standard for interlaced scanning, and said scanning means is deflected by said distance in one direction perpendicular to said line scanning direction for each even-number scanning line of the first and second fields and in the same direction perpendicular to said line scanning direction for each odd-number scanning line of the third and fourth fields, with the order of deflection of said scanning means having repeated continuously on a four-field cycle.